B. C. HOLT.
COMBINED HARVESTER.
APPLICATION FILED DEC. 12, 1916.

1,282,422.

Patented Oct. 22, 1918.
3 SHEETS—SHEET 1.

WITNESSES:
Charles Pickles
Frances V. Cole

INVENTOR
Ben C. Holt
BY Strong & Townsend
ATTORNEYS

B. C. HOLT.
COMBINED HARVESTER.
APPLICATION FILED DEC. 12, 1916.

1,282,422.

Patented Oct. 22, 1918.
3 SHEETS—SHEET 2.

WITNESSES:
Charles Robles
Frances V. Cole

INVENTOR
Ben C. Holt
BY Strong & Townsend
ATTORNEYS

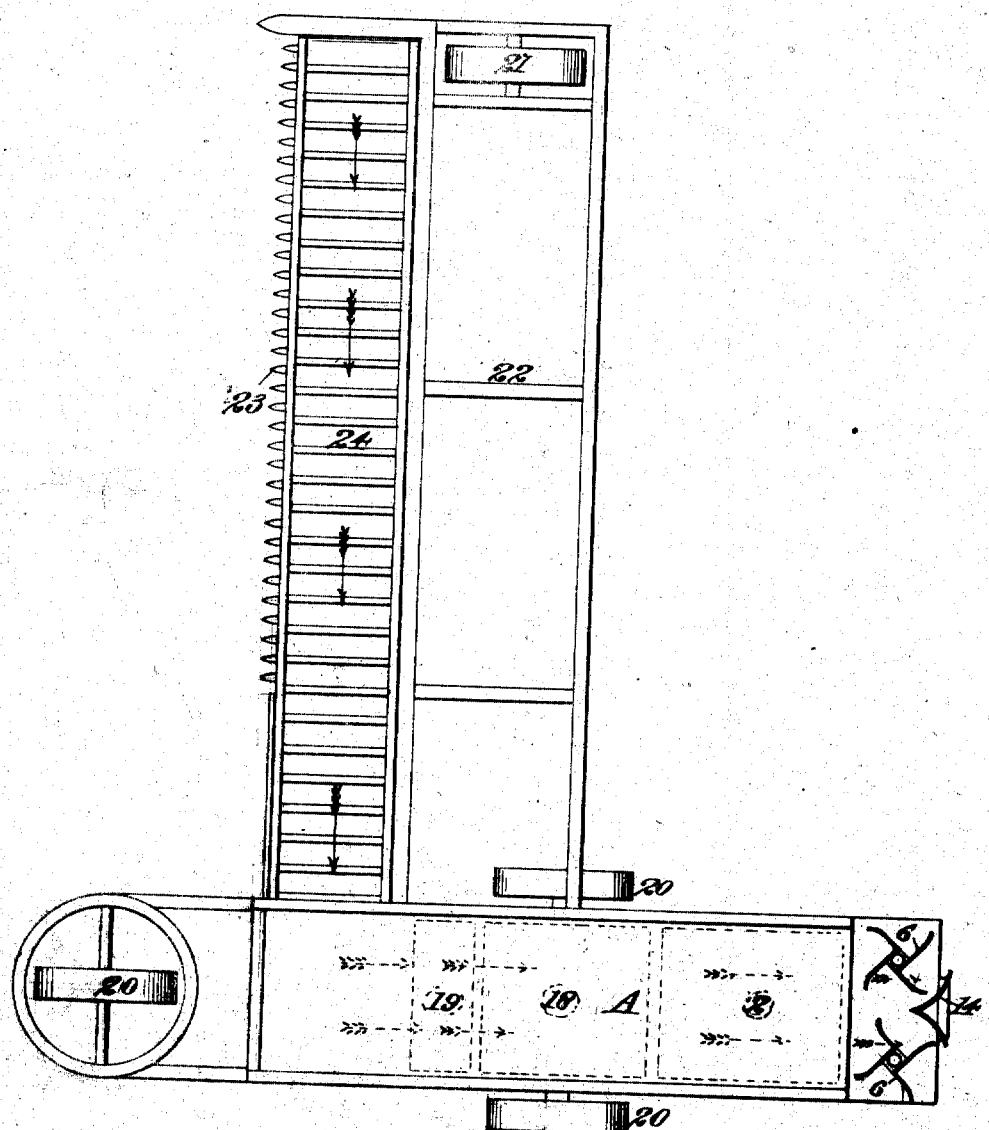

UNITED STATES PATENT OFFICE.

BEN C. HOLT, OF SPOKANE, WASHINGTON, ASSIGNOR TO THE HOLT MANUFACTURING COMPANY, OF STOCKTON, CALIFORNIA, A CORPORATION OF CALIFORNIA.

COMBINED HARVESTER.

1,282,422.   Specification of Letters Patent.   Patented Oct. 22, 1918.

Application filed December 12, 1916.   Serial No. 136,547.

*To all whom it may concern:*

Be it known that I, BEN C. HOLT, a citizen of the United States, residing at Spokane, in the county of Spokane and State of Washington, have invented new and useful Improvements in Combined Harvesters, of which the following is a specification.

This invention relates to combined harvesters, and pertains especially to an automatic straw spreader therefor.

At present in combined harvesters and threshers, straw is strewn back of the machine in narrow rows and where the grain is even moderately heavy, or the cut of the harvester is wide, the roll of straw deposited on the ground is so thick as to interfere seriously with subsequent cultivation. The practice has been to go over the field in a separate operation and dispose of the straw either by scattering or burning it. Scattering is preferable to burning since the straw has some value as a fertilizer, if evenly and thinly spread, whereas burning tends to injure the fertility of the soil. However, the labor of scattering the straw is so great that many are forced to dispose of it by burning it. It is the object of this invention to automatically scatter or spread the straw thinly and evenly over the ground in connection with cutting and threshing of the standing grain. This I accomplish by combining with the harvester and thresher scattering devices properly positioned and operated by the mechanism of the thresher.

Having reference to the accompanying drawings—

Fig. 7 is a plan view of a traveling combined harvester embodying the invention, showing the relative arrangement of the cutting, threshing and scattering mechanism.

Figure 1:
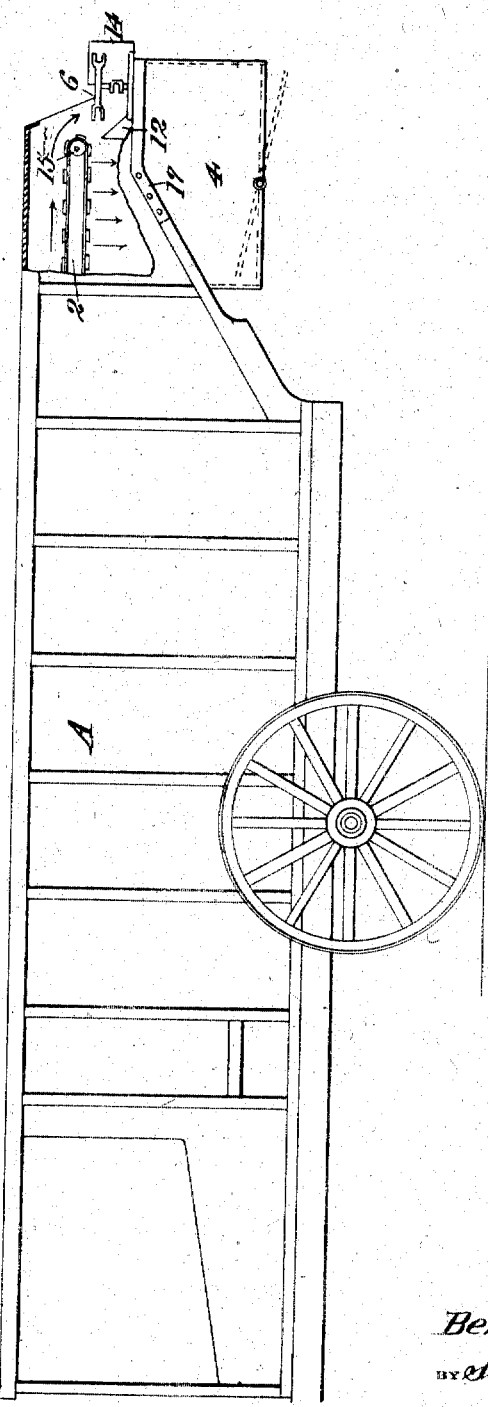
Figure 1 is a side elevation in partial section, of a combined harvester to which the invention is applied.
Figure 2:
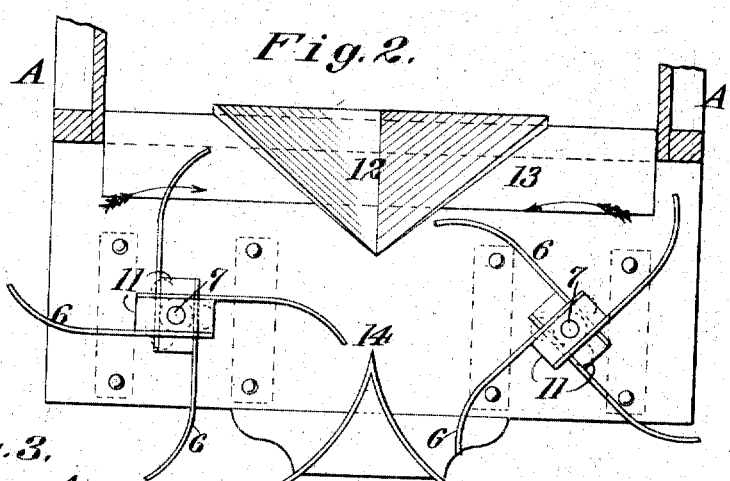
Fig. 2 is a plan and general arrangement of the spreader, without the drive.
Figure 3:
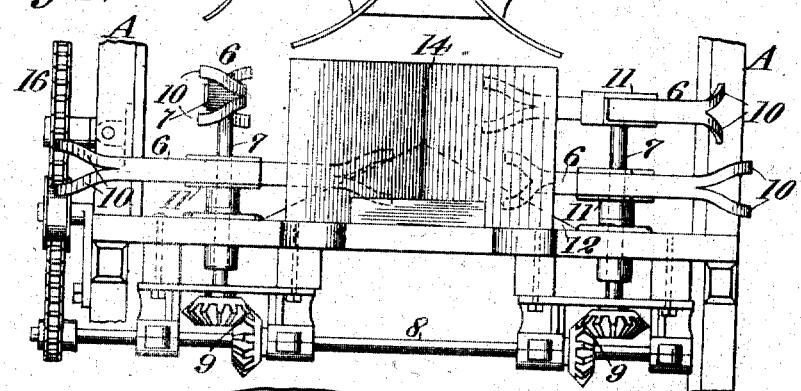
Fig. 3 is a front elevation of the spreader attachment showing the drive.
Figure 4:
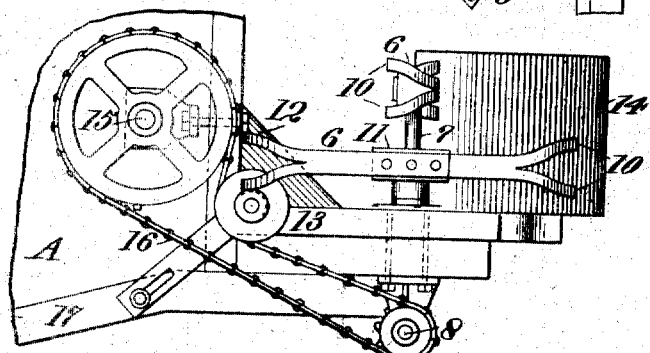
Fig. 4 is a side elevation of same.
Figure 5:
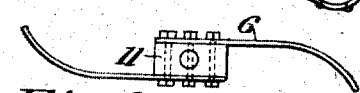
Fig. 5 and Fig. 6 are details of the spreader claws.
Figure 6:
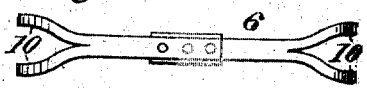

In a combined harvester, as is well known, the standing grain is cut, threshed and sacked in one operation, as the machine moves over the ground the straw and chaff being delivered at the rear and the threshed and sacked grain discharged from time to time from the machine as the sacks are filled and sewed.

A represents the frame and housing of a traveling harvesting and threshing machine supported on wheels 20. The usual header frame having its outer end supported on a grain wheel 21 is shown at 22. The header frame carries a cutter bar 23 which cuts the grain and causes it to fall on a draper 24 which conveys it in the well known manner to a threshing mechanism including a cylinder shown in dotted lines at 19, a separating screen 18 and a straw carrier 2 upon which the refuse straw and chaff, after the grain has been threshed, is delivered. In order to separate the chaff from the straw so that the chaff may be saved for feed, the straw carrier has slats set fairly wide apart, permitting the chaff to fall through into the dump 4 beneath. From the carrier 2 the straw is delivered to the straw scatterer, and distributed rearwardly behind the machine so that it will be plowed under during the later plowing season.

This straw scatterer consists preferably of two series of spreader arms and claws 6, arranged on opposite sides of the central axis of the machine and mounted on vertical shafts 7 driven from a horizontal shaft 8 by suitably beveled gearing 9.

The spreader arms are curved and bifurcated to form the claws 10, and are bolted to blocks 11 secured to respective vertical shafts 7. 12 is an inclined deflector which is arranged between the sets of spreader claws and mounted on the frame extension 13 of the machine, which carries the spreaders; this deflector 12 serving to receive the straw from the conveyer 2 and distributing it equally to the two sets of spreaders. 14 is a divider, or double concaved shield coöperating with the two sets of spreaders to cause the claws to gather the straw and to throw it outwardly and rearwardly of the machine. The two sets of spreaders revolve in opposite directions and are driven from the main power plant on the machine and directly from the straw conveyer shaft 15, by a suitable chain and sprocket mechanism 16.

The frame extension 13 for the spreader is supported by rearwardly extending bracket arms 17 bolted to the main frame of the thresher so that the scattering devices may be quickly attached and detached.

The formation of each set of spreading elements is by means of a pair of oppositely extending arms 6 on the hub 11 one pair being arranged some distance above the other, and at right angles thereto to form radial arms effective throughout a considerable depth. By the presence of the deflector 12 all straw from the conveyer or carrier 2 is guided on to the scatterers and the divider 14 serves to confine the straw so as to permit the scatterers to act more positively thereon. The bifurcated ends 10 on the scattering arms form tines, effective over a wider area and capable of engaging and pitching a large amount of straw. By arranging the scatterers below the plane of the conveyer or carrier 2, there is no opportunity for the scatterers to become clogged when the straw fed is unusually heavy.

It is manifest that various changes in details of construction may be resorted to without departing from the principle of the invention.

Having thus described my invention, what I claim and desire to secure by Letters Patent is:—

1. The combination with a combined harvester and thresher and its straw carrier, of a straw spreader in connection therewith, with means for dumping the chaff independent of the spreader.

2. The combination with a combined harvester and thresher, of a straw scatterer comprising two sets of straw scattering arms mounted on vertical axes and revolving in opposite directions, arranged on either side of the longitudinal line of the straw carrier, and beyond and below the same, and means for driving the straw scatterer arms from the straw carrier.

3. In a combined harvester and thresher having a straw scatterer, a straw scattering arm, which is curved substantially from end to end, with the outer ends of the arm bifurcated to form spreader claws.

4. The combination with a combined harvester and thresher, of means to receive the straw from the threshing mechanism and scatter it evenly and thinly over the ground.

5. The combination with a combined harvester and thresher, of means to deliver the straw to the rear of the thresher, and means coöperating with the straw delivery means to scatter the straw over the ground to opposite sides of the thresher.

6. The combination with a combined harvester and thresher, of a movable conveyer for delivering straw from the thresher, and means operatively connected with the movable conveyer to scatter the straw over the ground in a path of greater width than the conveyer.

7. In combination with harvesting and threshing mechanism, a movable conveyer to deliver straw from the thresher, and means arranged below the plane of the conveyer and in the rear thereof to scatter the straw evenly and thinly over the ground.

8. In combination with havesting and threshing mechanism, a movable conveyer to deliver straw from the thresher, means arranged below the plane of the conveyer and in the rear thereof to scatter the straw evenly and thinly over the ground, and an inclined guide between the conveyer and scattering means to direct the straw on to the latter.

9. In combination with harvesting and threshing mechanism, means to deliver straw from the thresher, a pair of horizontal rotatable scattering devices to receive the straw from said delivery means, and a divider between the scattering devices to confine the straw thereto.

10. In combination with harvesting and threshing mechanism, means detachably connected to the thresher frame to receive straw from the thresher, and spread it on the ground throughout a path of increased width.

In testimony whereof I have hereunto set my hand in the presence of two subscribing witnesses.

BEN C. HOLT.

Witnesses:
WADE GOODMAN,
MARTHA DAUGHS.